No. 753,220. PATENTED MAR. 1, 1904.
T. J. BAILIE & S. ANDERSON.
CATTLE GUARD.
APPLICATION FILED MAR. 19, 1903.
NO MODEL.
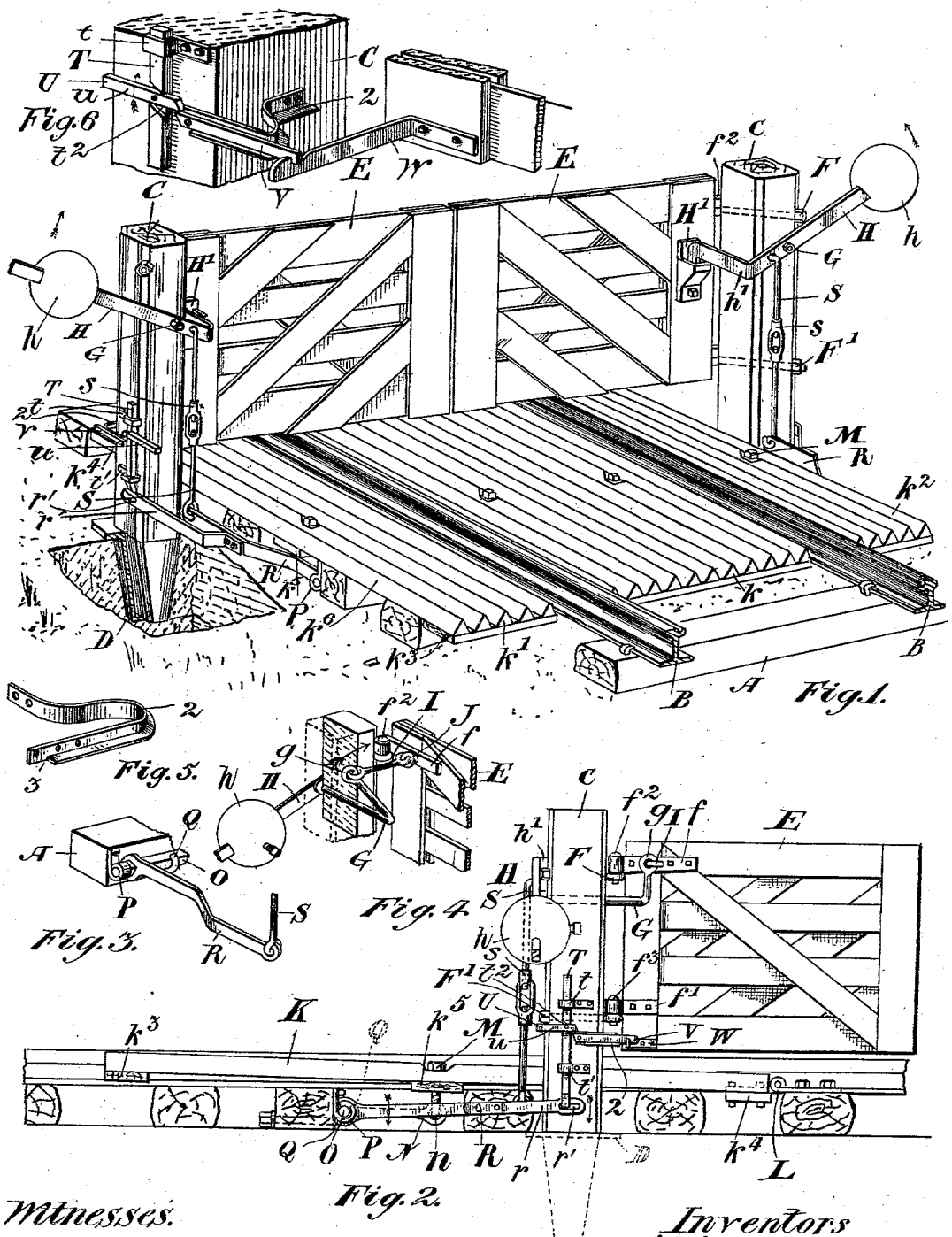
Witnesses:
F. C. Askwith
J. A. Symes.
Inventors
T. J. Bailie
S. Anderson
by Fred. B. Featherstonhaugh
Att'y.

No. 753,220. Patented March 1, 1904.

UNITED STATES PATENT OFFICE.

THOMAS JOHN BAILIE AND SAMUEL ANDERSON, OF OTTAWA, CANADA.

CATTLE-GUARD.

SPECIFICATION forming part of Letters Patent No. 753,220, dated March 1, 1904.

Application filed March 19, 1903. Serial No. 148,645. (No model.)

*To all whom it may concern:*

Be it known that we, THOMAS JOHN BAILIE, carpenter, and SAMUEL ANDERSON, blacksmith, both of the city of Ottawa, in the county of Carleton, Province of Ontario, Dominion of Canada, have invented certain new and useful Improvements in Cattle-Guards, of which the following is a specification.

Our invention relates to improvements in cattle-guards; and the objects of our invention are to devise a cattle-guard which shall be cheap and simple in construction and will effectually prevent cattle from crossing from cross-rods onto railroads, further objects being to make the device such that it will not disturb the solidity of the road-bed in any way and will not interfere with the passage of trains; and it consists, essentially, of a pair of posts and gates suitably hinged to the same, means being provided whereby the gates will be held normally in the position parallel with the rails and entirely beyond the sides of the widest part of any train, and a suitable platform or tread connected with the gates in such a manner that the weight of an animal endeavoring to cross the guard will depress the platform and swing the gates directly across the track, thus barring the passage of the animal, further means being provided for locking the gates automatically when closed, and the various parts of the device being constructed and arranged in detail, as hereinafter more particularly described.

Figure 1 is a perspective view of our cattle-guard, showing the gates in the closed position. Fig. 2 is a side view showing the gates open. Fig. 3 is a detail of a portion of the mechanism attached to the platform. Fig. 4 is a detail perspective view of the mechanism acting directly on the gate. Figs. 5 and 6 are detail perspective views of portions of the mechanism for locking the gates in the open position.

In the drawings like letters of reference indicate corresponding parts in each figure.

A represents the railroad-ties or sleepers, and B B are the rails.

C C are posts which may be driven into the ground or otherwise secured in their proper position at each side of the track. We prefer, however, to provide suitable sockets, such as D, which may be sunk in the ground, the lower ends of the posts being designed to extend thereinto, the objects of these sockets being to permit of the posts being removed in the winter and being replaced in the spring without necessitating all the measurements, leveling, &c., being done a second time.

E E are two gates which may be made of any suitable form. These gates are supported on suitable hinges formed by upper and lower eyebolts F F', extending diagonally through the posts, and ordinary hinge-leaves $f f'$, pintles $f^2 f^3$ extending through the knuckles of the hinged leaves and the eyes of the eyebolts.

G G are substantially L-shaped bars. These bars extend through holes in the posts C in a direction parallel with the rails, the bent portions extending upwardly beyond the posts and having eyes $g$ formed at their upper extremities. The ends of the bars G G opposite to the bent portions are rigidly secured to the levers H H, the levers being provided at or near their outer ends with weights $h\ h$.

I represents connecting-links which are secured at their ends to the eyes in the ends of the substantially L-shaped bars G G and at their opposite ends to suitable eyebolts J, which extend through the gates.

It will now be seen that the weights $h\ h$ will tend to hold the gates E E open, as shown in Fig. 2, by turning the bar G, which rotates the bent portion until the gates are wide open. It will be seen, however, that if means are provided whereby the weight of an animal would overcome the weight $h$ in its tendency to hold the gates open the gates would be immediately brought into the closed position, as shown in Fig. 1. For this purpose I have provided a platform K, which may be made in any suitable form, but consists, preferably, of three sections $k\ k'\ k^2$, located, respectively, between and at the sides of the rails. These sections consist of cross-pieces or battens $k^3\ k^4\ k^5$, located, respectively, at the front, rear, and center of the platform, and longitudinals $k^6$, secured to these battens, extending from front to rear of the platform. These longitudinals may be made of any desirable shape; but we prefer to make them triangular in cross-section, as shown in the drawings, in order to make it difficult for the animals to stand thereon for any length of time. At one end of the platform hinges L are provided, by means of which the platform is hinged to one of the ties. This hinge is preferably at the end of the platform remote from the cross-road; but, if desirable, it may be located at the opposite end or in any other suitable position.

M represents bolts having hooked lower portions. These bolts extend upwardly through the platform and are secured at their upper ends by suitable nuts. The hooked portion of each of these bolts engages an eye n, formed at the end of a crank-arm N. The opposite end of the arm N is rigidly secured to a bar O, which is preferably square. This bar extends completely from side to side of the platform and underneath the same and is provided at its ends with rounded portions, which are journaled in suitable bearings P, these bearings being secured by suitable means to any convenient tie. Intermediate of the ends of this bar supporting-brackets Q are provided. These brackets are preferably formed of bolts, which extend through the sleeper to which the bearing P is secured, and are formed at their ends with upwardly-curved portions.

R R are levers or bars which are rigidly secured at their ends to the square bar O, preferably just inside the bearing P. These bars extend toward the posts C C and are provided with eyes at their ends nearest to the posts. Connecting-rods S S are secured at their lower ends to the ends of the bars R R, their upper ends being secured to the levers H H on the side of the bars G G remote from the weights H H. These rods are provided with length-adjusting screw-swivels s s.

It will now be seen that if a cow or other animal endeavors to cross the guard it will have to step first on the platform. Its weight will cause the platform to be depressed, which will rotate the bar O, owing to the connection through the hooked bolt M and the arm N. The bars R, which are rigidly connected to the square bar O, will consequently be turned in the direction indicated by the arrow in Fig. 2. This will draw down the connecting-rods S S, thus turning the levers H H in the direction indicated by the arrows in Fig. 1. The substantially L-shaped bars G G, being rigidly secured to the levers H H, will consequently be rotated in the direction indicated by the arrow in Fig. 4, and thus it will be seen that the gates will immediately be forced into the closed position, thus making it impossible for the animal to pass along the track. The weights h will cause the gates to return to their normal position immediately the animal leaves the platform. In order that the animal may be prevented from forcing open the gates by actually pushing against them, we may provide an additional safety-lock, as shown in Fig. 1, which consists of sockets H' of suitable form secured to the gates E E, portions h' h' of the levers H H being bent in such a manner as to engage the sockets H' just as the gates come into the closed position, and it will thus be seen that it will be impossible for the animal to force the gates open by direct pressure. In order to prevent the gates from swinging across the track in a wind-storm or from the wind caused by a passing train or other reasons, we may provide an additional locking device for holding the gates in the open position. For this purpose we provide secondary bars r, which are secured adjustably to the bars R R. These secondary bars extend outwardly and terminate beside the outside of the posts C C. In the end of each of these bars a longitudinal slot r' is formed.

T T are vertical rods which are slidably held in suitable guides t t', these guides being secured to the posts C C by suitable means.

U represents pawls which are pivotally secured to the vertical rods T and are capable of rotation through a small angle from the horizontal position in the direction indicated by the arrow in Fig. 6; but their motion in the opposite direction is limited by suitable stops. The preferable way of constructing this portion of the device is to form a transverse recess $t^2$ in each of the vertical rods T, with the two opposite corners filed off, the other two corners being left. The pawl is located in this slot, and it will thus be seen that it will be capable of swinging in one direction only. The heavy end u of the pawl tends to keep it in the horizontal position.

V represents locking-bars which are pivotally secured to the posts by suitable means and are designed to extend out beyond the edge thereof in such a position as to engage with notches in projecting pieces W, which are secured rigidly to the lower portion of each of the gates. The preferable means of securing the locking-bar V pivotally to the post consists in providing an angle-iron 2, which is secured to the post by suitable means. The locking-bar is pivoted to the vertical web of the angle-iron and extends alongside of the same, resting normally on the horizontal web thereof. The part of the horizontal portion beneath the pivotal connection of the locking-bar is cut away, as shown at 3 in Fig. 5, thus permitting the long end v of the locking-bar to swing upwardly, while preventing it from dropping down when it is not in engagement with the projecting piece secured to the gate. The angle-iron 2 extends out beyond the post alongside of the locking-bar V and then curves around and is secured to the rear face of the post at its end, thus providing a support for the locking-bar V, whereby additional rigidity is obtained. The short end of the pawl U is designed to engage the short end of the locking-bar V as soon as the bar r is depressed by an animal stepping on the platform, and this takes place while the lost motion in the connections between the bars R and the gates E is being taken up and consequently before the gates begin to swing. It will thus be seen that the moment the weight comes on the platform the latch will be released and the gate is then free to open. When the weight is taken from the platform the rod T will be raised again by the bar r, thus causing the pawl U and the locking-bar to return to their normal position, as shown in the drawings, and it will thus be seen that the gates cannot be closed through any cause except pressure on the platform.

It will now be seen that we have devised a cheap, simple, and easily-operated cattle-guard which will absolutely prevent the accidents which have been so frequent in the past, owing to cattle straying along railroads and being struck by trains.

In manufacturing our invention it is to be understood that we may make a variety of changes in the details of construction of the device without departing from the spirit of our invention. Of these we may mention the gates, which may, if desirable, be constructed of very light material in order that if anything should happen to prevent their being opened they would not offer any considerable resistance to a train, but would simply open or break and allow the train to pass. Other changes might be made, but as they all come within the scope of mechanical skill they need not be referred to herein.

What we claim as our invention is—

1. In a cattle-guard, a hinged gate, a pivoted arm acting on said gate to hold it normally parallel with the track, a weight adjustably mounted on said arm, a depressible platform, an arm operated by the movement of said platform, and a link connecting said arm with the weighted arm, substantially as described.

2. In a cattle-guard the combination with a pair of gates suitably hinged to upright posts located at the sides of the track, of substantially L-shaped bars rotatably secured to the posts, connecting-rods each secured at one of its ends to the end of the bent portion, of one of the substantially L-shaped rods and at its other end to the one of the gates, a depressible platform and means interposed between the platform and the substantially L-shaped rod whereby the platform when depressed will rotate the substantially L-shaped rod thereby closing the gates and means for simultaneously raising the platform and rotating the substantially L-shaped rod in the opposite direction thereby opening the gates when the weight is removed from the platform as and for the purpose specified.

3. In a cattle-guard in combination a pair of gates, a pair of posts located at opposite sides of the track, said gates being suitably hinged to the posts, substantially L-shaped rods extending through the posts, the ends of their bent portions being connected to the gates by suitable rods or bars, levers rigidly secured to the ends of the substantially L-shaped bars, said levers being suitably weighted at their outer ends, a depressible platform suitably hinged to one of the sleepers, a horizontal bar extending transversely beneath the platform and journaled at its ends in suitable bearings, crank-arms rigidly secured to said horizontal bar at their inner ends and suitably secured to the platform at their opposite ends, bars rigidly secured to said horizontal bar in proximity to its ends, and connecting-rods secured at their upper ends to said levers and at their lower ends to said bars as and for the purpose specified.

4. The combination with the hinged gates and the means including the weighted levers for closing the gates when an animal endeavors to cross the guard, of sockets secured to the gates and bent portions formed at the inner ends of the levers, said bent portions being adapted to engage the sockets on the gates when the gates are just reaching the closed position as and for the purpose specified.

5. In a device of the class described, the combination with a swinging gate, the depressible platform, the post upon which the swinging gate is hinged, and the lever and connections whereby the lowering and raising of the platform operates to close and open the gates, of an auxiliary lever secured to said first-mentioned lever and having a slot in its end, a vertical rod slidably secured to the post and engaging the slot in the auxiliary lever, a pawl pivotally secured to said vertical rod, a notched projection secured to the gate and a locking-bar adapted to automatically engage said notched projection when the gate is in the open position, said pawl being adapted to release the locking-bar from engagement therewith when the platform is depressed as and for the purpose specified.

Signed at the city of Ottawa, in the Province of Ontario, this 7th day of March, 1903.

THOMAS JOHN BAILIE.
SAMUEL ANDERSON.

In presence of—
EDWARD P. FETHERSTONHAUGH,
MAY LYON.